(12) United States Patent
Takatsuka et al.

(10) Patent No.: US 10,919,410 B2
(45) Date of Patent: Feb. 16, 2021

(54) CHARGE/DISCHARGE CONTROL DEVICE, CHARGE/DISCHARGE CONTROL SYSTEM, AND REMAINING BATTERY CAPACITY ADJUSTMENT METHOD

(71) Applicant: OMRON CORPORATION, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto (JP)

( * ) Notice: Subject to any disclaimer, the term of this patent is extended or adjusted under 35 U.S.C. 154(b) by 288 days.

(21) Appl. No.: 15/758,236

(22) PCT Filed: Nov. 2, 2016

(86) PCT No.: PCT/JP2016/082596
§ 371 (c)(1),
(2) Date: Mar. 7, 2018

(87) PCT Pub. No.: WO2017/086164
PCT Pub. Date: May 26, 2017

(65) Prior Publication Data
US 2018/0254647 A1    Sep. 6, 2018

(30) Foreign Application Priority Data

Nov. 17, 2015 (JP) ................................. 2015-224439

(51) Int. Cl.
*H02J 7/00* (2006.01)
*B60L 58/12* (2019.01)
(Continued)

(52) U.S. Cl.
CPC ............. *B60L 58/12* (2019.02); *B60L 53/80* (2019.02); *B62J 99/00* (2013.01); *H02J 7/00* (2013.01);
(Continued)

(58) Field of Classification Search
CPC ........................................................ H02J 7/00
See application file for complete search history.

(56) References Cited

U.S. PATENT DOCUMENTS 6,741,065 B1 * 5/2004 Ishii .................... H02J 7/0024
320/122
2002/0140397 A1   10/2002 Hasegawa et al.
(Continued)

FOREIGN PATENT DOCUMENTS

| EP | 1391950 A1 | 2/2004 |
| EP | 2144314 A2 | 1/2010 |

(Continued)

OTHER PUBLICATIONS

The Japanese office action letter dated Nov. 26, 2019 in a related Japanese patent application.
(Continued)

*Primary Examiner* — Robert Grant
(74) *Attorney, Agent, or Firm* — Metrolex IP Law Group, PLLC

(57) ABSTRACT

A charge and discharge control device (30) controls the charging and discharging of a plurality of capacitors (11) configure to be removably connected in parallel to a vehicle (20). A receiver (34) acquires the remaining capacity of each of the capacitors (11). A required power calculator (33) calculates the amount of power required to reach a station (100) where the exchange of battery packs (10) including the capacitors (11) is performed, from position information about the station (100) and the current location of the vehicle (20). A target remaining capacity generator (35) calculates the target remaining capacity of each of the storage units (11) upon arrival at the station (100) from the required power amount calculated by the required power calculator (33) and sum of the remaining capacity of each of the storage units (11) acquired by the remaining capacity receiver (34). A
(Continued)

charge and discharge controller (36) performs charging and discharging among the storage units (11) so that the target remaining capacity calculated by the target remaining capacity generator (35) will be attained.

13 Claims, 6 Drawing Sheets

(51) Int. Cl.
  *B60L 53/80* (2019.01)
  *B62J 99/00* (2020.01)
  *H02J 7/34* (2006.01)
(52) U.S. Cl.
  CPC ............ *H02J 7/0047* (2013.01); *H02J 7/345* (2013.01); *B60L 2260/52* (2013.01); *B60L 2260/54* (2013.01); *H02J 7/0048* (2020.01); *Y02T 10/70* (2013.01)

(56) References Cited

U.S. PATENT DOCUMENTS

| | | | |
|---|---|---|---|
| 2009/0315359 | A1 | 12/2009 | Suzuki et al. |
| 2010/0241301 | A1* | 9/2010 | Yang ................ B60W 20/13 701/31.4 |
| 2010/0261043 | A1 | 10/2010 | Kim et al. |
| 2012/0319493 | A1 | 12/2012 | Kim et al. |
| 2013/0026828 | A1 | 1/2013 | Iwami |
| 2013/0229152 | A1 | 9/2013 | Kuramoto |
| 2014/0167657 | A1* | 6/2014 | Nishikawa ............ B60L 58/21 318/139 |
| 2015/0002102 | A1 | 1/2015 | Ohashi et al. |
| 2015/0123611 | A1 | 5/2015 | Huang |
| 2015/0258911 | A1 | 9/2015 | Sugiyama |
| 2015/0298565 | A1 | 10/2015 | Iwamura et al. |

FOREIGN PATENT DOCUMENTS

| | | |
|---|---|---|
| EP | 2555372 A1 | 2/2013 |
| EP | 2738908 A1 | 6/2014 |
| EP | 2894436 A1 | 7/2015 |
| JP | S63-133839 A | 6/1988 |
| JP | H9-163506 A | 6/1997 |
| JP | 2002-305843 A | 10/2002 |
| JP | 2005-237064 A | 9/2005 |
| JP | 2010-4666 A | 1/2010 |
| JP | 2010-71736 A | 4/2010 |
| JP | 2010-178514 A | 8/2010 |
| JP | 2010-183785 A | 8/2010 |
| JP | 2001-45673 A | 2/2011 |
| JP | 2012-113856 A | 6/2012 |
| JP | 2012-523670 A | 10/2012 |
| JP | 2013-183561 A | 9/2013 |
| JP | 2013-192327 A | 9/2013 |
| JP | 2014-121180 A | 6/2014 |
| JP | 2014-166846 A | 9/2014 |
| WO | 02/086993 A1 | 10/2002 |
| WO | 2013/014930 A1 | 1/2013 |
| WO | 2013108246 A2 | 7/2013 |
| WO | 2017/086165 A1 | 5/2017 |
| WO | 2014/115015 A1 | 4/2019 |

OTHER PUBLICATIONS

The extended European search report ("EESR") dated Apr. 29, 2019 in a related European patent application.
The extended European search report (EESR) dated Nov. 27, 2018 in a counterpart European patent application.
English translation of the International Search Report of PCT/JP2016/082596 dated Jan. 24, 2017.
English translation of the Written Opinion of PCT/JP2016/082596 dated Jan. 24, 2017.
English translation of the International Search Report of a related international application PCT/JP2016/082597 dated Dec. 27, 2016.
English translation of the Written Opinion of a related international application PCT/JP2016/082597 dated Dec. 27, 2016.
The Office Action dated May 26, 2020 in the related Japanese patent application.

* cited by examiner

CHARGE/DISCHARGE CONTROL DEVICE, CHARGE/DISCHARGE CONTROL SYSTEM, AND REMAINING BATTERY CAPACITY ADJUSTMENT METHOD

FIELD

The present invention relates to a charge and discharge control device for controlling the charging and discharging of a battery, a charge and discharge control system, and a remaining battery capacity adjustment method.

BACKGROUND

A vehicle equipped with a plurality of batteries that can be connected in parallel have been proposed in the past (see, for example, Patent Literature 1).

The vehicle in Patent Literature 1 is configured so that a plurality of batteries can be disposed spaced apart in the width direction of the vehicle. The user removes or adds batteries according to the distance to be traveled.

Meanwhile, in recent years a system has been constructed in which batteries installed in a vehicle such as an electric motorcycle or an electric bicycle are used and then exchanged at a station where charged batteries are available.

CITATION LIST

Patent Literature

Patent Literature 1: JP-A 2010-4666

SUMMARY

However, it is not envisioned that a plurality of batteries that can be connected in parallel as shown in Patent Literature 1 will be exchanged at the above-mentioned station, and it is conceivable that the following problem may be encountered.

Specifically, with a vehicle provided with a plurality of batteries that can be connected in parallel, the capacity usually decreases evenly. Therefore, we can imagine that all of the batteries will have to be replaced at the station, and this could take some time.

It is an object of the present invention to provide a charge and discharge control device, a charge and discharge control system, and a remaining battery capacity adjustment method, with which the time it takes to swap out batteries can be reduced.

Solution to Problem

The charge and discharge control device pertaining to the first invention is a charge and discharge control device that controls the charging and discharging of a plurality of batteries that can be removably connected in parallel to a moving body, said device comprising a remaining capacity acquisition component, a required power calculator, a target remaining capacity generator, and a charge and discharge controller. The remaining capacity acquisition component acquires the remaining capacity of each of the batteries. The required power calculator calculates the amount of power required to reach a station where battery exchange is performed from position information about the station and the current location of the moving body. The target remaining capacity generator calculates the target remaining capacity of each battery upon arrival at the station, from the required power amount calculated by the required power calculator and sum of the remaining capacity of each of the batteries acquired by the remaining capacity acquisition component. The charge and discharge controller performs charging and discharging among the batteries so that the target remaining capacity calculated by the target remaining capacity generator will be attained.

Consequently, the remaining capacity among the batteries upon arrival at the station can be adjusted. For example, rather than having the remaining capacity be the same for all of a plurality of batteries, it is possible for some of the batteries to have a low remaining capacity and others to have a high remaining capacity. The batteries with a low remaining capacity are then replaced with charged batteries available at the station, which makes it possible to efficiently increase the overall remaining capacity of the batteries in a moving body, with few battery replacements.

Examples of the movable body include vehicles such as electric motorcycles, electric bicycles, electric unicycles, electric automobiles (EVs), PHVs (plug-in hybrid vehicles), and the like.

The charge and discharge control device pertaining to the second invention is the charge and discharge control device pertaining to the first invention, wherein the target remaining capacity generator calculates the target remaining capacity of each of the batteries so that there will be a distribution in the remaining capacity of the plurality of batteries upon arrival at the station.

Consequently, upon arrival at the station, rather than having the remaining capacity be the same for all of a plurality of batteries, it is possible for there to be a distribution of the remaining capacity of the batteries, so that some of the batteries will have a low remaining capacity. Therefore, the overall remaining capacity of the batteries can be efficiently increased, with few battery replacements, by replacing batteries having a low remaining capacity with charged batteries available at the station.

The charge and discharge control device pertaining to the third invention is the charge and discharge control device pertaining to the first invention, wherein the target remaining capacity generator calculates the target remaining capacity of each of the batteries so that the remaining capacity of each of the batteries upon arrival at the station will be between a lower limit value and an upper limit value set for the batteries.

This allows the remaining capacity of a plurality of batteries to be adjusted between the lower limit value and the upper limit value of the batteries.

The charge and discharge control device pertaining to the fourth invention is the charge and discharge control device pertaining to the second invention, further comprising a lower limit value acquisition component. The lower limit value acquisition component acquires the lower limit value of the remaining capacity for a plurality of batteries. The target remaining capacity generator sets the target remaining capacity for at least one of the plurality of batteries to be the lower limit set for that battery.

Consequently, upon arrival at the station, there can be as many batteries as possible whose remaining capacity is at the lower limit value, so the overall remaining capacity of the batteries in a moving body can be efficiently increased by replacing those batteries whose remaining capacity is at the lower limit value.

The charge and discharge control device pertaining to the fifth invention is the charge and discharge control device pertaining to the fourth invention, wherein, when there are a plurality of the batteries that cannot be set to the lower limit value, the target remaining capacity generator sets the target remaining capacity of each of the batteries so that the remaining capacity of one of the plurality of batteries will be as small a value as possible upon arrival at the station.

This allows the remaining capacity of one of the batteries that have not reached the lower limit value upon arrival at the station to be kept as low as possible. Therefore, the overall remaining capacity of the batteries in a moving body can be efficiently increased by replacing those batteries whose remaining capacity is at the lower limit value and batteries whose remaining capacity is as low as possible with charged batteries.

The charge and discharge control device pertaining to the sixth invention is the charge and discharge control device pertaining to the second invention, further comprising an upper limit value acquisition component. The upper limit value acquisition component acquires an upper limit value for the remaining capacity in a plurality of batteries. The target remaining capacity generator sets the target remaining capacity for at least one of the plurality of batteries to be the upper limit set for that battery.

Consequently, upon arrival at the station, there can be as many batteries as possible whose remaining capacity is at the upper limit value. Consequently, and conversely, the number of batteries whose remaining capacity is low can be maximized. The overall remaining capacity of the batteries in a moving body can be efficiently increased by replacing these batteries whose remaining capacity is low.

The charge and discharge control device pertaining to the seventh invention is the charge and discharge control device pertaining to the sixth invention, wherein, when there are a plurality of the batteries that cannot be set to the upper limit value, the target remaining capacity generator sets the target remaining capacity of each of the batteries so that the remaining capacity of one of these batteries will be as large a value as possible upon arrival at the station.

This allows the remaining capacity of one of the batteries that have not reached the upper limit value upon arrival at the station to be kept as low as possible. Therefore, and conversely, the number of batteries whose remaining capacity is low can be maximized. The overall remaining capacity of the batteries in a moving body can be efficiently increased by replacing these batteries whose remaining capacity is low.

The charge and discharge control device pertaining to the eighth invention is the charge and discharge control device pertaining to the second or third invention, wherein the target remaining capacity generator calculates the target remaining capacity of each of the batteries so as to maximize the difference between the overall remaining capacity in the group of one or more of the batteries to be replaced at the station, and the overall remaining capacity in the group of one or more of the batteries not to be replaced, upon arrival at the station.

Thus, upon arrival at the station, the difference between the overall remaining capacity of the batteries in the group to be replaced at the station and the overall remaining capacity of the batteries in the group not to be replaced can be maximized. Therefore, the overall remaining capacity of the batteries in a moving body can be efficiently increased by replacing the batteries of the group to be replaced, with the charged batteries at the station.

The charge and discharge control device pertaining to the ninth invention is the charge and discharge control device pertaining to the fourth invention, wherein the lower limit value acquisition component sets the lower limit value.

Since the lower limit value acquisition component can thus acquire the lower limit value by setting the lower limit value, the lower limit value can be freely set.

The charge and discharge control device pertaining to the tenth invention is the charge and discharge control device pertaining to the sixth invention, wherein the upper limit value acquisition component sets the upper limit value.

Since the upper limit value acquisition component can thus acquire the upper limit value by setting the upper limit value, the upper limit value can be freely set.

The charge and discharge control device pertaining to the eleventh invention is the charge and discharge control device pertaining to the third or fourth invention, wherein the lower limit value is zero or the discharge lower limit value.

This allows the remaining capacity of one or more batteries to be reduced to zero or the discharge lower limit value upon arrival at the station. For example, the discharge lower limit value is set to 20% of the full charge capacity of a battery.

The charge and discharge control device pertaining to the twelfth invention is the charge and discharge control device pertaining to the third or sixth invention, wherein the upper limit value is the value of the full charge capacity or the charge upper limit value.

This allows the remaining capacity of one or more batteries to be increased to the full charge capacity value or the charge upper limit value upon arrival at the station. For example, the charge upper limit value is set to 80% of the full charge capacity of the battery.

The charge and discharge control device pertaining to the thirteenth invention is the charge and discharge control device pertaining to the first invention, wherein the moving body is an electric motorcycle or an electric bicycle.

Here, a vehicle, including an electric motorcycle and an electric bicycle, is used as the moving body.

This allows a battery with a low remaining capacity to be efficiently replaced with a charged battery at the station.

The charge and discharge control system pertaining to the fourteenth invention comprises a remaining capacity estimator, a required power calculator, a target remaining capacity generator, and a charge and discharge controller. The remaining capacity estimator estimates the remaining capacity of batteries that can be removably connected in parallel to a moving body. The required power calculator calculates the amount of power required to reach a station where battery exchange is performed from position information about the station and the current location of the moving body. The target remaining capacity generator calculates the target remaining capacity of each battery upon arrival at the station, from sum of the remaining capacity of each of the batteries estimated by the remaining capacity estimator. The charge and discharge controller performs charging and discharging among the batteries so that the target remaining capacity calculated by the target remaining capacity generator will be attained.

The charge and discharge control system controls a plurality of batteries based on the remaining capacity of each battery estimated by the remaining capacity estimator.

This allows the moving body to acquire the remaining capacity of each of a plurality of batteries, and to control the remaining capacity.

Therefore, upon arrival at the station, it is possible to efficiently increase the overall remaining capacity of the battery packs in a moving body with few battery pack replacements.

The remaining battery capacity adjustment method pertaining to the fifteenth invention is a remaining battery capacity adjustment method for adjusting the remaining capacity of a plurality of batteries that can be removably connected in parallel to a moving body, said method comprising a remaining capacity acquisition step, a power calculation step, a target remaining capacity generation step, and a charge and discharge control step. The remaining capacity acquisition step involves acquiring the remaining capacity of each of the batteries. The power calculation step involves calculating the amount of power to reach a station where battery exchange is performed from position information about the station and the current location of the moving body. The target remaining capacity generation step involves calculating the target remaining capacity of each battery upon arrival at the station, from the required power amount calculated in the required power calculation step and sum of the remaining capacity of each of the batteries acquired in the remaining capacity acquisition step. The charge and discharge control step involves performing charging and discharging among the batteries so that the target remaining capacity calculated in the target remaining capacity generation step will be attained.

This allows the remaining capacity among battery packs to be adjusted upon arrival at the station. For example, rather than having the remaining capacity be the same for all of a plurality of battery packs, a distribution can be applied so that the remaining capacity will be lower for some of the batteries, allowing some of the batteries to have a low remaining capacity and others to have a high remaining capacity. The batteries with a low remaining capacity are then replaced with charged batteries available at the station, which makes it possible to efficiently increase the overall remaining capacity of the battery packs in a moving body, with few battery pack replacements.

Effects

With the charge and discharge control device, the charge and discharge control system, and the remaining battery capacity adjustment method of the present invention, the work entailed by replacing battery packs can be reduced.

DETAILED DESCRIPTION

The battery system, charge and discharge control device, and remaining battery capacity adjustment method pertaining to an embodiment of the present invention will now be described through reference to the drawings.

1. Configuration 1-1. Battery System 1

Figure 1:
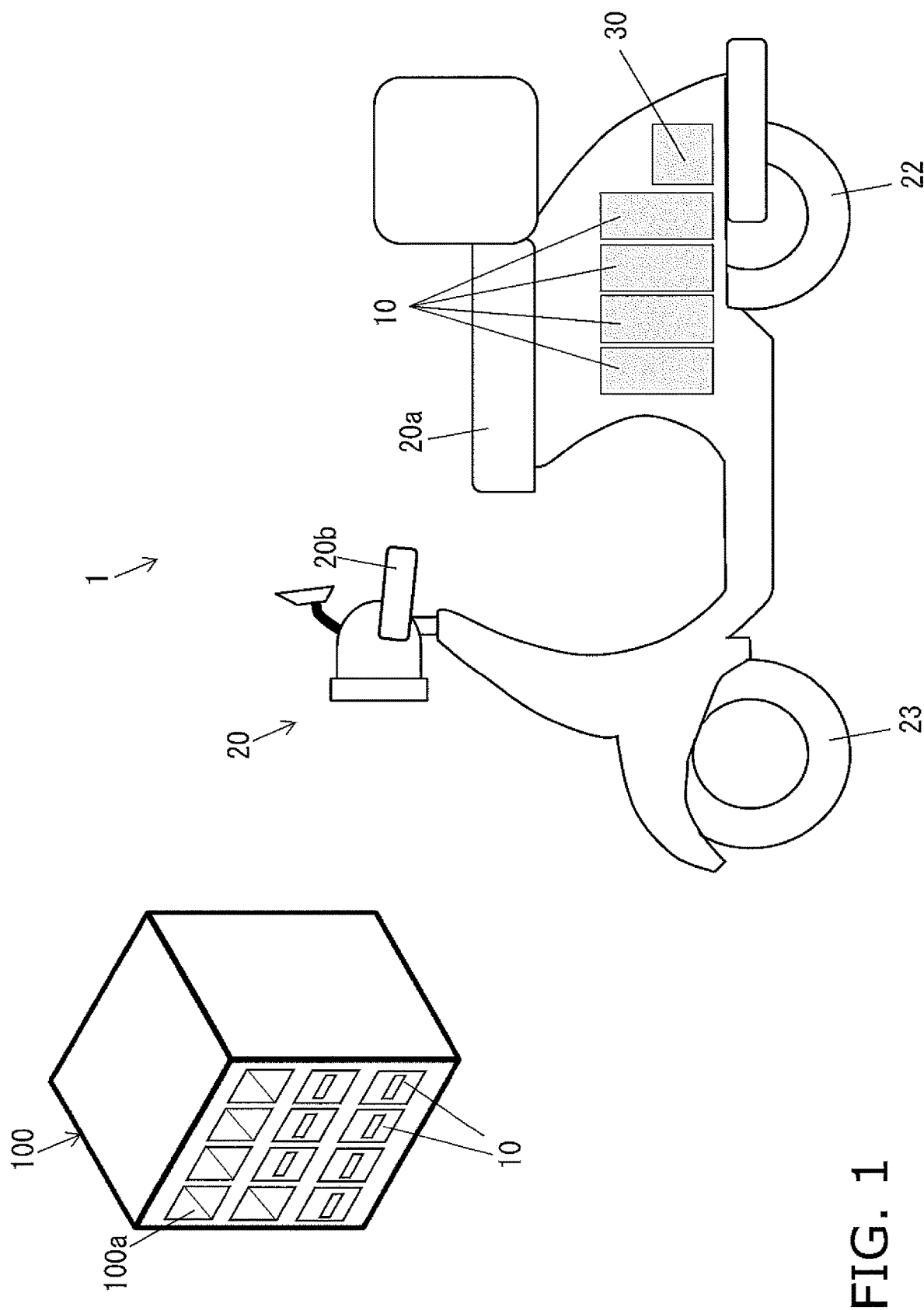
FIG. 1 shows the battery system and a station where battery packs are exchanged in an embodiment of the present invention.

The battery system 1 pertaining to the present embodiment is a system that supplies power to a vehicle 20, and as shown in FIG. 1, comprises battery packs 10 and the vehicle 20.

As shown in FIG. 1, four battery packs 10 are installed in the vehicle 20, such as an electric motorcycle.

In the vehicle 20, power is supplied from the four battery packs 10 installed in a space under a seat 20a, and the rear wheel (drive wheel) 22 is rotationally driven so that the vehicle can travel.

The vehicle 20 can make use of what is known as a battery swap, in which the battery packs 10 whose remaining capacity has been reduced by travel, natural discharge, or the like are replaced with charged battery packs 10 at a specific station 100. As shown in FIG. 1, the station 100 has receptacles 100a into which a plurality of batteries packs 10 are inserted. The battery packs 10 are disposed in these receptacles 100a. Stations 100 are set up at a plurality of locations such as gasoline stations.

1-2. Battery Packs 10

In order to supply power to the vehicle 20, in this embodiment four of the battery packs 10 are installed in the vehicle 20 in a manner that allows them to be replaced. Here, when distinguishing among the four battery packs 10, they will be called battery packs 10A, 10B, 10C and 10D.

Figure 2:
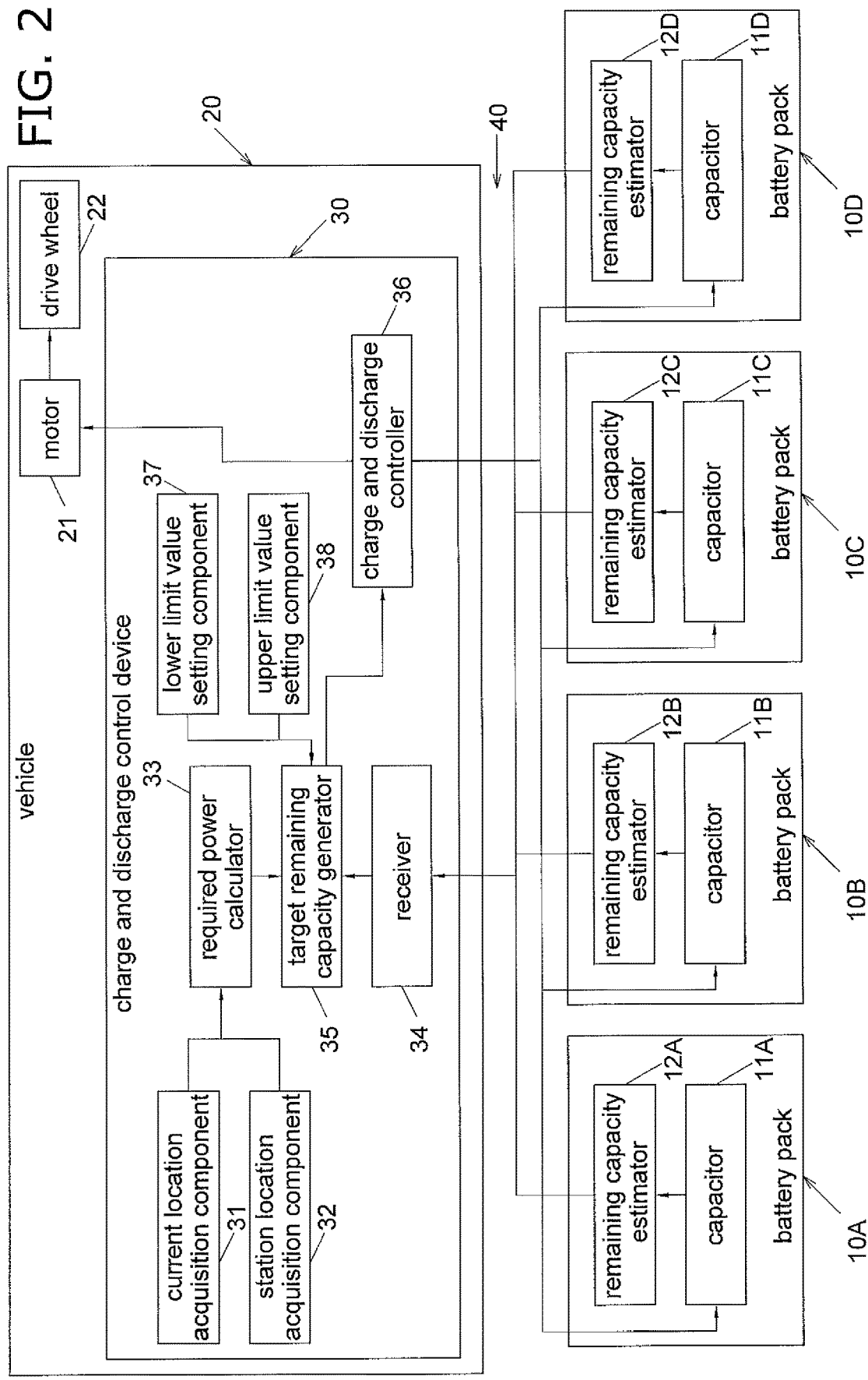
FIG. 2 is a block diagram of the configuration of the battery system in FIG. 1.
Figure 3:
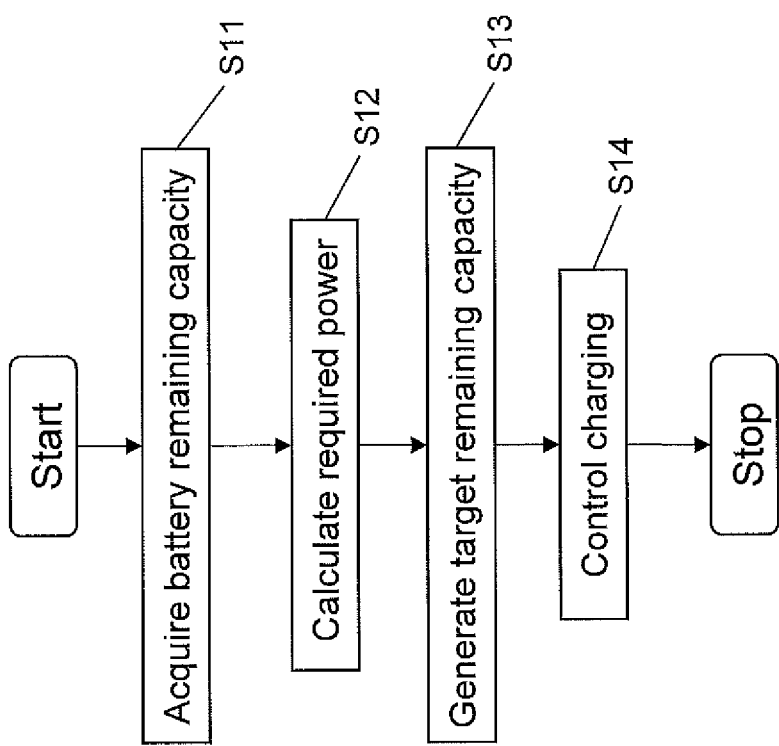
FIG. 3 is a flowchart of the operation of the charge and discharge controller in FIG. 1.

As shown in FIG. 2, the four battery packs 10 each have a capacitor 11 and a remaining capacity estimator 12. To distinguish between the four capacitors 11 and the four remaining capacity estimators 12, they will be called the capacitors 11A, 11B, 11C, and 11D, and the remaining capacity estimators 12A, 12B, 12C, and 12D. Specifically, the battery pack 10A has the capacitor 11A and the remaining capacity estimator 12A, the battery pack 10B has the capacitor 11B and the remaining capacity estimator 12B, the capacity estimator 12C has the capacitor 11C and the remaining capacity estimator 12C, and the battery pack 10D has the capacitor 11D and the remaining capacity estimator 12D.

The capacitors 11A, 11B, 11C, and 11D store or discharge electric power. When the four battery packs 10A, 10B, 10C, 10D are installed in the vehicle 20, the four capacitors 11A, 11B, 11C, 11D are electrically connected in parallel to the vehicle 20. Therefore, even if just one of the four battery packs 10 is installed in the vehicle 20, power can still be supplied to the motor 21, and the vehicle 20 can be ridden.

The remaining capacity estimators 12 estimate the remaining capacity of the capacitors 11 by measuring current or voltage. Specifically, the remaining capacity estimator 12A estimates the remaining capacity of the capacitor 11A, the remaining capacity estimator 12B estimates the remaining capacity of the capacitor 11B, the remaining capacity estimator 12C estimates the remaining capacity of the capacitor 11C, and the remaining capacity estimator 12D estimates the remaining capacity of the capacitor 11D.

The remaining capacity estimators 12A, 12B, 12C, and 12D transmit the estimated remaining capacity of the capacitors 11A, 11B, 11C, and 11D to the vehicle 20.

1-3. Vehicle 20

The vehicle 20 is an electric motorcycle that is propelled when supplied with power from the four battery packs 10 installed under the seat 20a, and as shown in FIG. 2, the vehicle 20 has the motor 21, the rear wheel (drive wheel) 22, a front wheel 23 (see FIG. 1), and a charge and discharge control device 30.

The motor 21 receives the power supplied from the battery packs 10 and transmits a rotational driving force to the axle of the rear wheel 22, which is the drive wheel.

The front wheel 23 is a steered wheel provided between the front part of the vehicle 20 and the road surface, and the travel direction can be varied by changing the orientation in conjunction with the orientation of the handle bar 20b.

The rear wheel 22 is a drive wheel provided between the road surface and the rear part of the vehicle 20 where the battery packs 10 are installed, and is rotationally driven by the motor 21.

1-4. Charge and Discharge Control Device 30

The charge and discharge control device 30 controls charging and discharging of the four capacitors 11. The charge and discharge control device 30 has a current location acquisition component 31, a station location acquisition component 32, a required power calculator 33, a receiver 34, a target remaining capacity generator 35, a charge and discharge controller 36, a lower limit value setting component 37, and an upper limit value setting component 38.

The current location acquisition component 31 acquires the current location of the vehicle 20. The current location acquisition component 31 acquires the current location using a GPS (Global Positioning System), for example.

The station location acquisition component 32 acquires location information for the station 100. The station location acquisition component 32 stores the location information for a plurality of stations 100 in advance and extracts the location information for the station 100 selected by the user. The station location acquisition component 32 may also select the station 100 automatically, rather than leaving the selection to the user. For example, the station location acquisition component 32 may automatically choose the station 100 closest to the current location by using the current location information acquired by the current location acquisition component 31.

The required power calculator 33 calculates the amount of power required until arrival at the station 100 from the current location, from the current location information acquired by the current location acquisition component 31 and the location information for the station 100 to be reached that was acquired from the station location acquisition component 32.

The receiver 34 receives and acquires information about the remaining capacity of the battery packs 10A, 10B, 10C, and 10D. More precisely, the receiver 34 acquires the remaining capacity of each of the capacitors 11A, 11B, 11C, and 11D from the remaining capacity estimators 12A, 12B, 12C, and 12D of the battery packs 10A, 10B, 10C, and 10D respectively. Communication between the remaining capacity estimators 12A, 12B, 12C and 12D and the receiver 34 may be by wire or wireless.

The lower limit value setting component 37 sets the lower limit values of the capacitors 11A, 11B, 11C, and 11D to specific values. As will be described below, in this embodiment the lower limit value setting component 37 sets the lower limit values of the capacitors 11A, 11B, 11C, and 11D to the discharge lower limit value.

The upper limit value setting component 38 sets the upper limit values of the capacitors 11A, 11B, 11C, and 11D to specific values. As will be described below, in this embodiment the upper limit value setting component 38 sets the upper limit values of the capacitors 11A, 11B, 11C, and 11D to the charge upper limit value.

The target remaining capacity generator 35 generates a remaining capacity that will be the target for each of the capacitors 11A, 11B, 11C and 11D so that there will be a distribution in the remaining capacity of the capacitors 11A, 11B, 11C, and 11D, on the basis of the overall remaining capacity of the four capacitors 11 at the current location and the amount of power required to arrive at the station 100. Generating the target remaining capacity so that there will be a distribution in the remaining capacity will be discussed in detail below. Also, when setting the target remaining capacity, the target remaining capacity generator 35 sets the target remaining capacity to be between the lower limit value set by the lower limit value setting component 37 and the upper limit value set by the upper limit value setting component 38.

The charge and discharge controller 36 controls charging and discharging of the capacitors 11A, 11B, 11C, and 11D so as to reach the target remaining capacity generated by the target remaining capacity generator 35 upon arrival at the station.

The charge and discharge control device 30 and the remaining capacity estimators 12A, 12B, 12C, and 12D in this embodiment correspond to an example of a charge and discharge control system, and are shown as a charge and discharge control system 40 in FIG. 2.

2. Operation

The operation of the battery system 1 in this embodiment will now be described, and an example of the remaining battery capacity adjustment method of the present invention will also be described at the same time.

Figure 4:
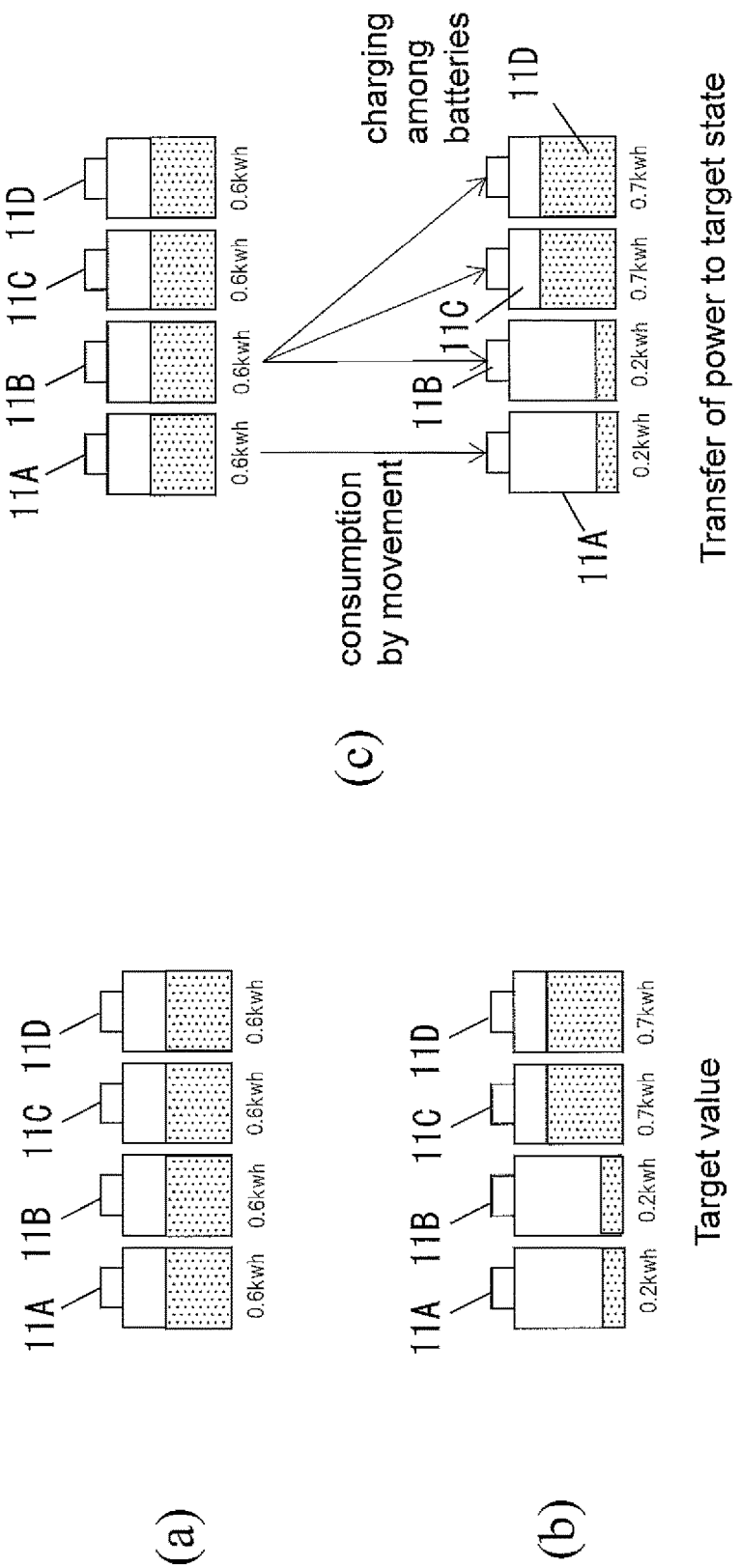
FIG. 4a shows an example of the remaining capacity of each of four capacitors in the current location.
FIG. 4b is shows an example of the target remaining capacity of each of the four capacitors.
FIG. 4c shows an example of the transition in the power of the four capacitors in movement to a station.
FIG. 4d shows an example of the remaining capacity of each of the four capacitors after replacing the battery packs at the station.

First, the receiver 34 acquires the remaining capacity of the capacitors 11A, 11B, 11C, and 11D from the remaining capacity estimators 12A, 12B, 12C, and 12D in the battery packs 10A, 10B, 10C, and 10D, respectively (step S11). For example, if we let the full charge capacity of the capacitors 11A, 11B, 11C, and 11D be 1 kwh, the receiver 34 receives information that the remaining capacity of the capacitors 11A, 11B, 11C, and 11D is 0.6 kwh at the current location, as shown in FIG. 4, for example. Step S11 corresponds to an example of the remaining capacity acquisition step.

Next, the required power calculator 33 calculates the amount of power required to reach the station from the current location (step S12). More precisely, the amount of power required to arrive at the station 100 from the current location is calculated from the current location information acquired by the current location acquisition component 31 and the location information for the station 100 to be reached that was acquired from the station location acquisition component 32. In the example shown in FIG. 4a, the required power is 0.6 kwh. Step S12 corresponds to an example of the power calculation step. In this embodiment, the remaining capacity is controlled to be between the charge upper limit value set by the upper limit value setting component 38 and the discharge lower limit value set by the lower limit value setting component 37. Here, the charge upper limit value is set, for example, to 80% of the full charge capacity, and if we assume the full charge capacity to be 1 kwh, the result is 0.8 kwh. Meanwhile, the discharge lower limit value is set, for example, to 20% of the full charge capacity, which is 0.2 kwh. Deterioration of the capacitors 11 tends to occur if the batteries are discharged below the discharge lower limit value, and deterioration of the capacitors 11 also tends to occur if the batteries are charged above the charge upper limit value.

Next, the target remaining capacity generator 35 calculates the target remaining capacity value for each of the capacitors 11A, 11B, 11C, and 11D (step S13). Here, the target remaining capacity generator 35 sets the target remaining capacity of each capacitor 11 so that as many capacitors 11 as possible will have a remaining capacity at the discharge lower limit value (0.2 kwh) upon arrival at the station. This allows the overall remaining capacity in the vehicle 20 to be efficiently increased, with few replacements of the battery packs 10.

The target remaining capacity generator 35 generates the target remaining capacity of each of the capacitors 11A, 11B, 11C, and 11D as shown in FIG. 4b, for example. In FIG. 4b, the target remaining capacity of the capacitors 11A and 11B is set to the discharge lower limit value (0.2 kwh), and the target remaining capacity of the capacitors 11C and 11D is set to 0.7 kwh. More precisely, the overall remaining capacity of the four capacitors 11A, 11B, 11C, and 11D (that is, the overall remaining capacity of the battery packs 10A, 10B, 10C, and 10D) at the current location is 2.4 kwh (=0.6 kwh×4), and the power required to reach the station 100 is 0.6 kwh, so the overall remaining capacity upon arrival at the station 100 is calculated to be 1.8 kwh. This overall remaining capacity of 1.8 kwh is allocated to some of the capacitors 11 so that as many of the capacitors 11 as possible will have a remaining capacity at the lower limit value. Since the discharge lower limit of each of the capacitors 11 is 0.2 kwh, the remaining capacity is allocated as 0.2 kwh each to all of the capacitors 11. The remaining 1.0 kwh (1.8 kwh−(0.2 kwh×4)) is allocated to some of the capacitors 11. Because the difference between the charge upper limit value and the discharge lower limit value of one capacitor 11 is 0.6 kwh, the sum of putting together the difference of two capacitors 11 is 1.2 kwh, which is greater than the above-mentioned 1.0 kwh. Therefore, it can be seen that the remaining capacity of 1.0 kwh can be allocated to two of the capacitors 11, the remaining capacity of these two capacitors 11 can be set to 0.7 kwh, and the remaining capacity of the other two capacitors 11 can be 0.2 kwh.

Consequently, the target remaining capacity generator 35 can set the target remaining capacity of the capacitors 11C and 11D to 0.7 kwh by setting the target remaining capacity of the capacitors 11A and 11B to 0.2 kwh, dividing the remaining capacity of 1.0 kwh in two, and adding the discharge lower limit (0.2 kwh). Step S13 corresponds to an example of the target remaining capacity calculation step.

The charge and discharge controller 36 controls the capacitors 11A, 11B, 11C, and 11D so as to be the target remaining capacity generated by the target remaining capacity generator 35 (step S14). Charge and discharge control may be performed so that the remaining capacity of each of the capacitors 11 becomes the target remaining capacity. An example of charge and discharge control will be described through reference to FIG. 4c. The charge and discharge controller 36 performs control so that, from the current location to the station 100, power is supplied to the motor 21 from the remaining capacity (0.4 kwh) down to the discharge lower limit value (0.2 kwh) of the capacitor 11A and part (0.2 kwh) of the remaining capacity down to the discharge lower limit value (0.2 kwh) of the capacitor 11B in the state shown at the top in FIG. 4c (the same as the state shown in FIG. 4a), and the rest of the remaining capacity (0.2 kwh) down to the lower limit value of the capacitor 11B is moved to the capacitors 11C and 11D. Consequently, as shown at the bottom in FIG. 4c, the remaining capacity of the capacitor 11A upon arrival at the station 100 is 0.2 kwh (the discharge lower limit value), the remaining capacity of the capacitor 11B is 0.2 kwh (the discharge lower limit value), the remaining capacity of the capacitor 11C is 0.7 kwh, and the remaining capacity of the capacitor 11D is 0.7 kwh. Step S14 corresponds to an example of the charge and discharge control step.

When remaining capacity of the capacitors 11 is adjusted as above and the vehicle 20 arrives the station 100, the user replaces the battery packs 10A and 10B whose remaining capacity is the discharge lower limit value (0.2 kwh) with charged battery packs 10 available at the station 100. Consequently, as shown in FIG. 4d, the remaining capacity of the battery packs 10A and 10B is 0.8 kwh each, and the overall remaining capacity of the battery packs 10 installed in the vehicle 20 is 3.0 kwh.

3. Features, etc.

(3-1)

As described above, the charge and discharge control device 30 in this embodiment, as shown in FIG. 2, is a charge and discharge control device that controls the charging and discharging of the capacitors 11A, 11B, 11C, and 11D, which can be removably connected in parallel to the vehicle 20, and comprises the receiver 34, the required power calculator 33, the target remaining capacity generator 35, and the charge and discharge controller 36. The receiver 34 acquires the remaining capacity of each of the capacitors 11. The required power calculator 33 calculates the amount of power required to reach the station 100 from location information for the station 100 where exchange of the battery packs 10 (including the capacitors 11) is performed, and the current location of the vehicle 20. The target remaining capacity generator 35 calculates the target remaining capacity of each of the capacitors 11A, 11B, 11C, and 11D upon arrival at the station, from the power amount calculated by the required power calculator 33 and the sum of the remaining capacity of each of the capacitors 11A, 11B, 11C, and 11D acquired by the receiver 34. The charge and discharge controller 36 performs charging and discharging among the capacitors 11A, 11B, 11C, and 11D so as to attain the target remaining capacity calculated by the target remaining capacity generator 35.

Consequently, the remaining capacity of the capacitors 11A, 11B, 11C, and 11D upon arrival at the station can be adjusted. For example, as shown in FIG. 4c, the capacitors 11A and 11B can have a remaining capacity at the discharge lower limit value (0.2 kwh) and the capacitors 11C and 11D can have a remaining capacity of 0.7 kwh. The battery pack 10A of the capacitor 11A whose remaining capacity is at the discharge lower limit value (0.2 kwh) and the battery pack 10B of the capacitor 11B whose remaining capacity is at the discharge lower limit value (0.2 kwh) can be replaced with charged battery packs 10 available at the station 100, so that the overall remaining capacity of the four battery packs 10 in the vehicle 20 can be efficiently increased, with few replacements of the battery packs 10.

(3-2)

With the charge and discharge control device 30 in this embodiment, the target remaining capacity generator 35 calculates the target remaining capacity of each of the capacitors 11 so that there is a distribution in the remaining capacity of the capacitors 11 upon arrival at the station.

Consequently, a distribution can be provided in the remaining capacity of the capacitors 11 upon arrival at the station, and as shown in FIG. 4c, the capacitors 11A and 11B will have a remaining capacity at the discharge lower limit value (0.2 kwh). Therefore, the battery pack 10A of the capacitor 11A and the battery pack 10B of the capacitor 11B whose remaining capacity is at the discharge lower limit value (0.2 kwh) can be replaced with charged battery packs 10 available at the station 100, so the overall remaining capacity of the four battery packs 10 in the vehicle 20 can be efficiently increased, with few replaces of the battery packs 10.

(3-3)

The charge and discharge control device 30 in this embodiment further comprises the lower limit value setting component 37. The lower limit value setting component 37 sets the lower limit value for the remaining capacity in the capacitors 11A, 11B, 11C, and 11D. The target remaining capacity generator 35 sets the lower limit value for at least one of the capacitors 11A, 11B, 11C, and 11D (the capacitor 11A) so that the target remaining capacity will be the lower limit value set for that capacitor 11A.

Consequently, as many capacitors 11 as possible will have a remaining capacity at the discharge lower limit value (0.2 kwh) upon arrival at the station, so the battery packs 10 of the capacitors 11 whose remaining capacity is at the discharge lower limit value (0.2 kwh) (battery packs 10A and 10B in the example of FIG. 4) can be exchange, which efficiently increases the overall remaining capacity of the capacitors 11 in the vehicle 20. In the example of FIG. 4, the overall remaining capacity can be increased from 1.8 kwh to 3.0 kwh.

(3-4)

The charge and discharge control system 40 in this embodiment comprises the remaining capacity estimator 12, the required power calculator 33, the target remaining capacity generator 35, and the charge and discharge controller 36. The remaining capacity estimator 12 estimates the remaining capacity of capacitors 11 that can be removably connected in parallel to the vehicle 20. The required power calculator 33 calculates the amount of power required to reach the station 100 from location information about the station 100 where battery packs 10 are exchanged, and the current location of the vehicle 20. The target remaining capacity generator 35 calculates the target remaining capacity of the respective capacitors 11 upon arrival at the station from the sum of the remaining capacities of the capacitors 11 estimated by the remaining capacity estimator 12. The charge and discharge controller 36 performs charging and discharging among the capacitors 11 so as to attain the target remaining capacity calculated by the target remaining capacity generator 35.

Consequently, the charge and discharge control system 40 can acquire the remaining capacity for each of the capacitors 11 and control the remaining capacity.

Therefore, the overall remaining capacity of the battery packs 10 in the vehicle 20 upon arrival at the station 100 can be efficiently increased, with few replacements of the battery packs 10.

(3-5)

The remaining battery capacity adjustment method in this embodiment is a remaining battery capacity adjustment method for adjusting the remaining capacity of a plurality of capacitors 11 that can be removably connected in parallel to the vehicle 20, and comprises a step S11, a step S12, a step S13, and a step S14. Step S11 involves acquiring the remaining capacity of each of the capacitors 11. Step S12 involves calculating the amount of power required to reach the station 100 where exchange of the capacitors 11 is carried out, from location information about the station 100 and the current location of the vehicle 20. Step S13 involves calculating the target remaining capacity of each of the capacitors 11 upon arrival at the station, from the power amount calculated in step S12 and the sum of the remaining capacity of each of the capacitors 11 acquired in step S11. Step S14 involves performing charging and discharging among the capacitors 11 so as to attain the target remaining capacity calculated in step S13.

Consequently, the remaining capacity can be adjusted among the capacitors 11 upon arrival at the station 100.

4. Other Embodiments

An embodiment of the present invention was described above, but the present invention is not limited to the above embodiment, and various modifications are possible without departing from the gist of the invention.

(A)

In the above embodiment, the target remaining capacity was set to the discharge lower limit value (0.2 kwh) for capacitors 11A and 11B with which the remaining capacity upon arrival at the station 100 could be set to the discharge lower limit value (0.2 kwh), while the target remaining capacity was set so that a remaining capacity of 1.0 kwh would be evenly allocated for the capacitors 11C and 11D with which the remaining capacity could not be set to the discharge lower limit value (0.2 kwh), but this is not the only option. For example, the target remaining capacity of each of the capacitors 11 may be set so that if there are more than one of the other capacitors 11 that cannot be set to the discharge lower limit value (0.2 kwh), the remaining capacity of one of those capacitors 11 will be as small a value as possible upon arrival at the station 100. When the system is controlled in this way, the remaining capacity of one of the capacitors 11C and 11D will be at the upper limit charge value (0.8 kwh), and the remaining capacity of the other one will be 0.6 kwh.

Figure 5:
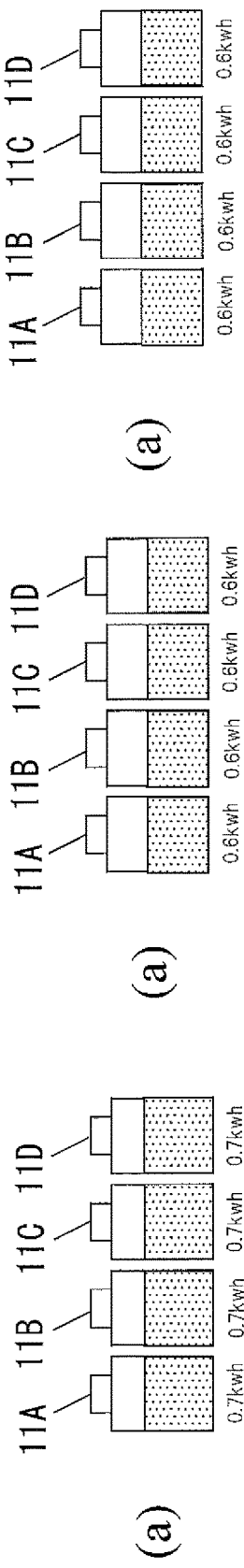
FIG. 5a shows the remaining capacity of each of the four capacitors at the current location in a modification example of the embodiment pertaining to the present invention.
FIG. 5b shows the target remaining capacity of each of the four capacitors in a modification example of the embodiment pertaining to the present invention.
FIG. 5c shows the remaining capacity of each of the four capacitors after battery pack exchange in a modification example of the embodiment pertaining to the present invention.

Another example is shown in FIGS. 5a to 5c. As shown in FIG. 5a, let us assume that there are capacitors 11A, 11B, 11C, and 11D whose full charge capacity is 1 kwh, and the remaining capacity of each of the capacitors 11A, 11B, 11C, and 11D at the current location is 0.6 kwh. If we assume that the amount of power required to the station 100 is 0.2 kwh, overall remaining capacity upon arrival at the station 100 is calculated to be 2.2 kwh. Subtracting the discharge lower limit values of the four capacitors 11 (0.2 kwh) from the overall remaining capacity leaves 1.4 kwh. This remaining capacity of 1.4 kwh is less than the sum (1.8 kwh) of the difference (0.6 kwh) between the charge upper limit value (0.8 kwh) and the discharge lower limit value (0.2 kwh) for three capacitors, so one capacitor can be set to the discharge lower limit value (0.2 kwh). The remaining capacity of 1.4 kwh is allocated to the other three capacitors 11B, 11C, and 11D. Here, if we assume that the remaining capacity of capacitor 11B (one of the three capacitors 11B, 11C, and 11D) is kept as low as possible, as shown in FIG. 5b, the target remaining capacity of two of the capacitors 11C and 11D is set to the charge upper limit value (0.8 kwh), and the target remaining capacity of the other capacitor 11B is set to 0.4 kwh.

Consequently, upon arrival at the station 100, the remaining capacity of each of the capacitors 11A, 11B, 11C, and 11D is the remaining capacity indicating by the target remaining capacity in FIG. 5b. In view of this, it is possible to efficiently increase the overall remaining capacity of the battery packs installed in the vehicle 20 by replacing the battery pack 10A of the capacitor 11A and the battery pack 10B of the capacitor 11B with charged battery packs 10. That is, the capacity can be increased from 2.2 kwh to 3.2 kwh as in FIG. 5c, which shows the state after exchange.

The capacitor 11B whose remaining capacity is 0.4 kwh may not be replaced, at the user's discretion.

(B)

In the above embodiment, control was performed so that the target remaining capacity was set to the discharge lower limit value (0.2 kwh) for the capacitors 11A and 11B with which the remaining capacity upon arrival at the station 100 could be set to the discharge lower limit value (0.2 kwh), and there will be as many capacitors 11 as possible whose remaining capacity is at the discharge lower limit value (0.2 kwh), but control may instead be performed so as to produce as many capacitors 11 as possible at the charge upper limit value (0.8 kwh). In this case, the target remaining capacity generator 35 sets at least the capacitor 11A (one of the capacitors 11A, 11B, 11C, and 11D) so that the target remaining capacity will be the upper limit value (0.8 kwh) set for the capacitor 11A.

Furthermore, the target remaining capacity of each of the capacitors 11 may be set so that the remaining capacity of one of the capacitors 11 that do not reach the charge upper limit value (0.8 kwh) will be as large a value as possible upon arrival at the station 100.

Figure 6:
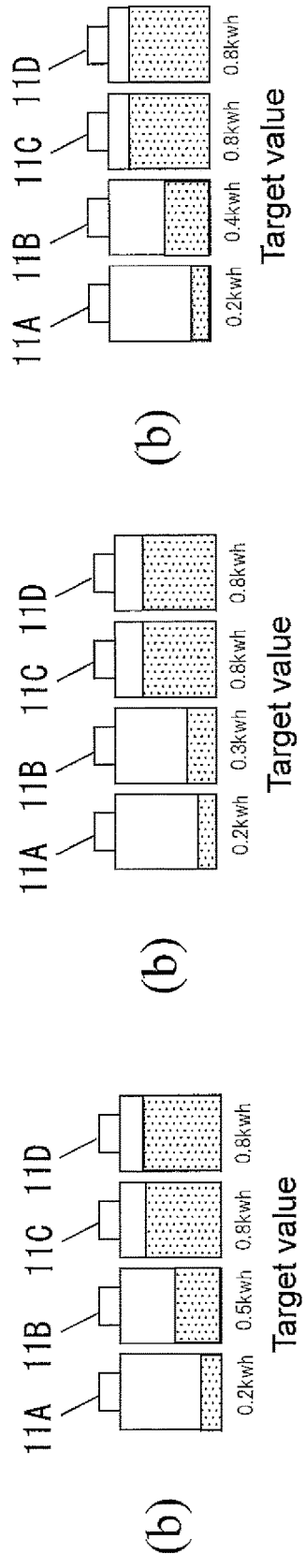
FIG. 6a a shows the remaining capacity of each of the four capacitors at the current location in a modification example of the embodiment pertaining to the present invention.
FIG. 6b shows the target remaining capacity of each of the four capacitors in a modification example of the embodiment pertaining to the present invention.
FIG. 6c shows the remaining capacity of each of the four capacitors after battery pack exchange in a modification example of the embodiment pertaining to the present invention.

This control will be described through reference to FIGS. 6a, 6b, and 6c. As shown in FIG. 6a, let us assume that there are capacitors 11A, 11B, 11C, and 11D whose full charge capacity is 1 kwh, and the remaining capacity of each of the capacitors 11A, 11B, 11C, and 11D is 0.6 kwh at the current location. If we then assume that 0.3 kwh of power will be required to the station 100, the overall remaining capacity upon arrival at the station 100 is calculated to be 2.1 kwh. First, 0.2 kwh is allocated to each of the four capacitors 11 so that the four capacitors 11 will have a remaining capacity equal to the discharge lower limit value (0.2 kwh). The remaining 1.3 kwh is at least two times (1.2 kwh) the difference (0.6 kwh) between the charge upper limit value and the discharge lower limit value of the capacitors 11, and is no more than three times (1.8 kwh), so two of the capacitors 11 can be set to the charge upper limit value (0.8 kwh). Consequently, the target remaining capacity of the capacitors 11C and 11D is set to the charge upper limit value (0.8 kwh). The remaining 0.1 kwh (=1.3 kwh-1.2 kwh) is then allocated to the capacitor 11B so that the remaining capacity of the capacitor 11B (out of the capacitors 11A and B, other than the capacitors 11C and 11D) will be as large as possible. Consequently, the target remaining capacity of the capacitor 11A is set to 0.2 kwh, and the target remaining capacity of the capacitor 11B is set to 0.3 kwh.

Thus, upon arrival at the station 100, the remaining capacity of the capacitor 11A is 0.2 kwh, and the remaining capacity of the capacitor 11B is 0.3 kWh. In view of this, the battery pack 10A of the capacitor 11A and the battery pack 10B of the capacitor 11B are replaced with charged battery packs 10, allowing the overall remaining capacity of the battery packs installed in the vehicle 20 to be efficiently increased. The overall capacity of the fourth battery packs 10 can be increased from 2.1 kwh to 3.2 kwh as in FIG. 6c, which shows the state after the exchange. In this control, if the amount of power required to the station 100 is 0.2 kwh, then the target remaining capacity will be set the same as in FIG. 5b. Furthermore, in this control, if the amount of power required to the station 100 is 0.1 kwh, the target remaining capacity of the capacitor 11B is set to 0.5 kwh.

(C)

In the above embodiment, control was performed so that there would be as many capacitors 11 as possible whose remaining capacity was at the discharge lower limit value, but this is not the only option. For example, the target remaining capacity generator 35 may calculate the target remaining capacity of each of the capacitors 11 so as to maximize the difference between the overall remaining capacity in the group of the capacitors 11A and 11B that are to be exchanged and the overall remaining capacity in the group of the capacitors 11C and 11D that are not to be exchanged, upon arrival at the station 100.

This maximizes the difference between the overall remaining capacity of the capacitors 11A and 11B and the overall remaining capacity of the capacitors 11C and D upon arrival at the station 100. Therefore, the overall remaining capacity of the battery packs in the vehicle 20 can be efficiently increased by replacing the battery pack 10A of the capacitor 11A and the battery pack 10B of the capacitor 11B in the group with low remaining capacity.

As to the capacitors 11 to be replaced, the number of battery packs 10 that can be replaced at the station 100 scheduled for arrival may be determined in advance, and that number may be used as the battery packs 10 to be replaced. The number of battery packs 10 that can be replaced at this station 100 may be transmitted to the charge and discharge control device 30 by communication. Also, a user may determine in advance the number of battery packs 10 to be replaced.

Figure 7:
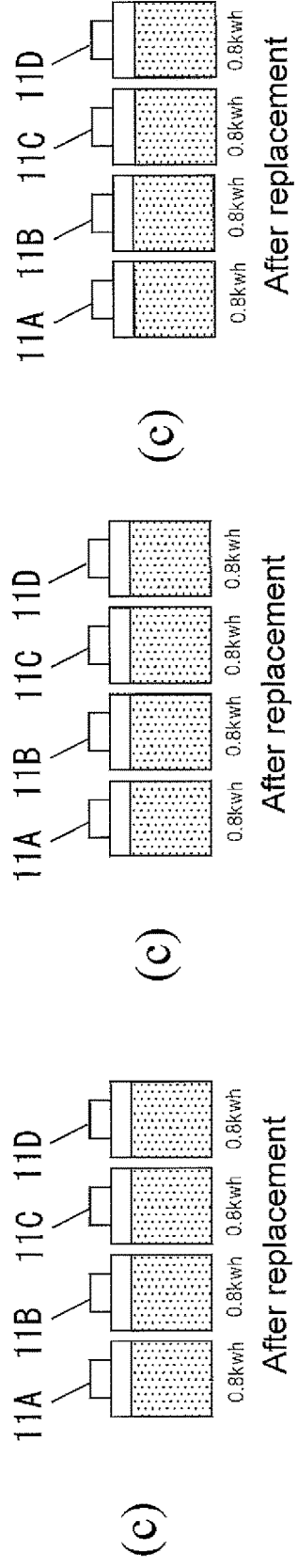
FIG. 7a a shows the remaining capacity of each of the four capacitors at the current location in a modification example of the embodiment pertaining to the present invention.
FIG. 7b shows the target remaining capacity of each of the four capacitors in a modification example of the embodiment pertaining to the present invention.
FIG. 7c shows the remaining capacity of each of the four capacitors after battery pack exchange in a modification example of the embodiment pertaining to the present invention.

This control will be described through reference to FIGS. 7a, 7b, and 7c. As shown in FIG. 7a, let us assume that there are capacitors 11A 11B, 11C, and 11D whose full charge capacity is 1 kwh, and the capacitors 11A 11B, 11C, and 11D each have a remaining capacity of 0.7 kwh at the current location. Let us then assume that the amount of power required to the station 100 is 0.5 kwh, and that two battery packs 10 are scheduled for replacement.

In this case, the capacitors are divided into the group of capacitors 11A and 11B that are to be exchanged and the group of capacitors 11C and 11D that are not to be exchanged, and the target remaining capacity of the capacitors 11A 11B, 11C, and 11D is set so as to maximize the difference between the overall remaining capacity of the exchange group and the overall remaining capacity of the non-exchange group upon arrival at the station 100. In the case of FIG. 7a, the target remaining capacity is set so that the overall remaining capacity of the exchange group will be 0.7 kwh, and the overall remaining capacity of the non-exchange group will be 1.6 kwh. The capacity can then be increased from 2.3 kwh to 3.2 kwh as in FIG. 7c, which shows the state after the exchange. The overall remaining capacity of 0.7 kwh in the exchange group may be allocated evenly or unevenly to the capacitors 11A and 11B.

(D)

In the above embodiment, the lower limit value was set to the discharge lower limit value by the lower limit value setting component 37, and the upper limit value was set to the charge upper limit value by the upper limit value setting component 38, but the lower limit value may be 0 (zero) and the upper limit value may be set to full charge capacity (100%).

Figure 8:
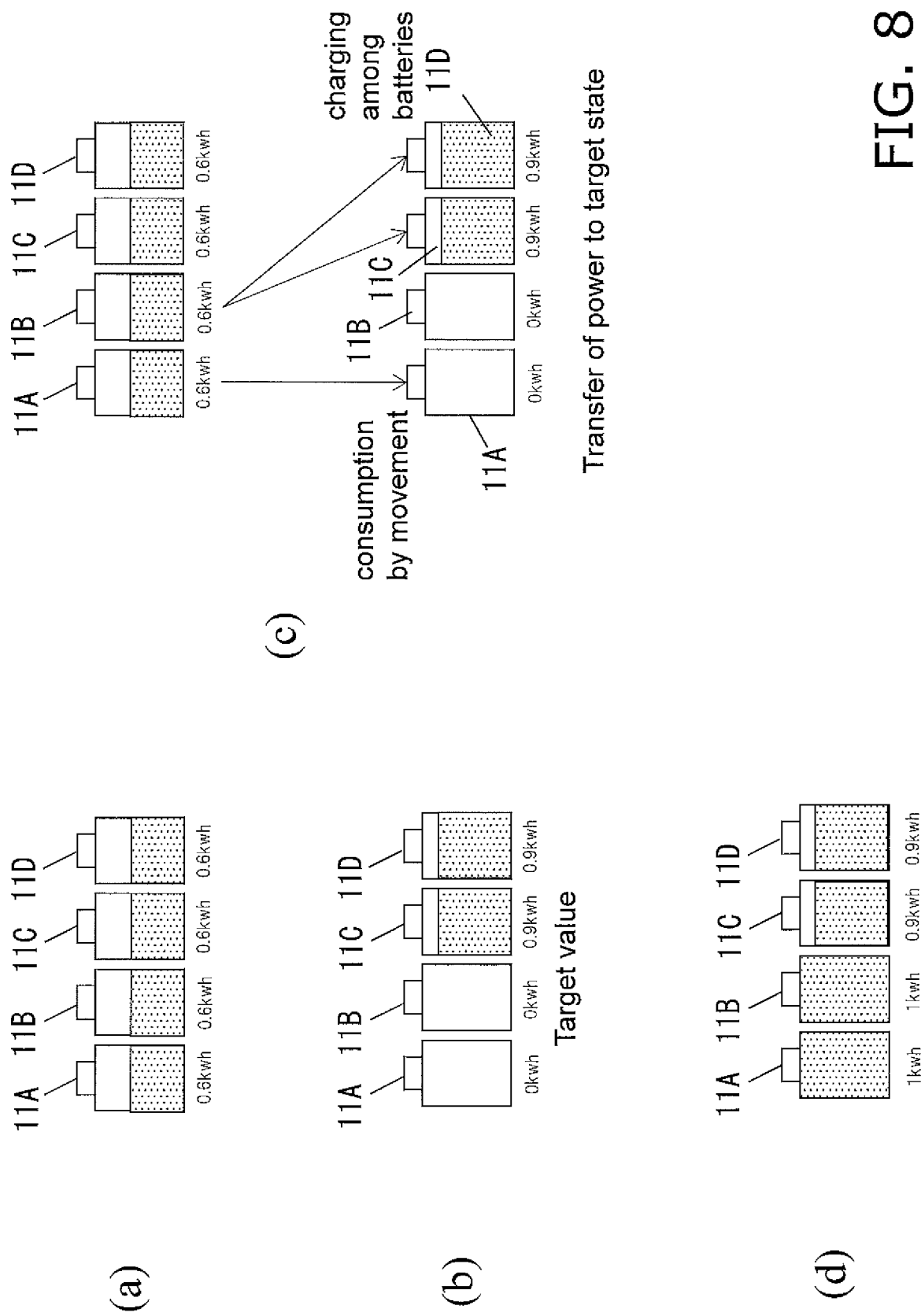
FIG. 8a a shows an example of the remaining capacity of each of the four capacitors at the current location in a modification example of the embodiment pertaining to the present invention.
FIG. 8b shows an example of the target remaining capacity of each of the four capacitors in a modification example of the embodiment pertaining to the present invention.
FIG. 8c shows an example of the transition in the power of the four capacitors in movement to a station in a modification example of the embodiment pertaining to the present invention.
FIG. 8d shows the remaining capacity of each of the four capacitors after battery pack exchange in a modification example of the embodiment pertaining to the present invention.

FIGS. 8a to 8d show an example. As shown in FIG. 8a, let us assume that there are capacitors 11A 11B, 11C, and 11D whose full charge capacity is 1 kwh and that the remaining capacity of each of the capacitors 11A 11B, 11C, and 11D at the current location is 0.6 kwh. If we then assume that amount of power required to the station 100 is 0.6 kwh, the overall remaining capacity upon arrival at the station 100 is calculated to be 1.8 kwh. This overall remaining capacity of 1.8 kwh is allocated to some of the capacitors 11 so as to produce as many capacitors 11 as possible whose remaining capacity is zero. For example, since the full charge capacity of one capacitor 11 is 1 kwh, the combined value of the full charge capacity of two capacitors 11 is greater than the overall remaining capacity of 1.8 kwh upon arrival at the station 100. Therefore, it can be seen that the overall remaining capacity of 1.8 kwh can be allocated to the two capacitors 11, and the remaining capacity of the other two capacitors 11 can be brought down to zero.

Consequently, as shown in FIG. 8b, the target remaining capacity generator 35 can set the target remaining capacity of the capacitors 11A and 11B to zero, and set the target remaining capacity of the capacitors 11C and 11D to 0.9 kwh by dividing the overall remaining capacity of 1.8 kwh in two. An example of charge and discharge control will be described through reference to FIG. 8c. The charge and discharge controller 36 performs control so that power is supplied to the motor 21 from the capacitor 11A in the state shown at the top in FIG. 8c (the same as the state in FIG. 8a) from the current location to the station 100, and the remaining capacity of the capacitor 11B is moved to the capacitors 11C and 11D. Consequently, as shown at the bottom in FIG. 8c, upon arrival at the station 100, the remaining capacity of the capacitor 11A is zero, the remaining capacity of the capacitor 11B is zero, the remaining capacity of the capacitor 11C is 0.9 kwh, and the remaining capacity of the capacitor 11D is 0.9 kwh.

Then, when the battery pack 10A and the battery pack 10B are replaced with charged battery packs 10, as shown in FIG. 8d, the remaining capacity of each of the battery packs 10A and 10B is 1 kwh, and the overall remaining capacity of the battery packs 10 installed in the vehicle 20 is 3.8 kwh.

(E)

In the above embodiment, four of the battery packs 10 were provided, but the number is not limited to four, and may be more than four or less than 4.

(F)

In the above embodiment, the full charge capacity of one capacitor 11 was 1.0 kwh, but is not limited to this.

(G)

In the above embodiment, the remaining capacity estimator 12 was provided inside the battery pack 10, and the charge and discharge control device 30 acquired the remaining capacity of the capacitors 11 through the receiver 34 (an example of a remaining capacity acquisition component), but the remaining capacity estimator 12 may be provided to the charge and discharge control device 30 instead of the battery pack 10. In this case, the remaining capacity estimator 12 provided to the charge and discharge control device 30 detects the remaining capacity of each of the capacitors 11 of a plurality of batteries packs 10. When the remaining capacity estimator 12 is thus provided to the charge and discharge control device 30, the remaining capacity estimator 12 corresponds to an example of a remaining capacity acquisition component.

(H)

In the above embodiment, the lower limit value setting component 37 and the upper limit value setting component 38 set and acquired the lower limit value and the upper limit value, but may instead just acquire the lower limit value and the upper limit value, without setting them. The lower limit value and upper limit value may be stored in advance in a memory or the like, and the target remaining capacity generator 35 may generate the remaining capacity of the battery packs 10 on the basis of the stored upper limit value and lower limit value.

(I)

In the above embodiment, the target remaining capacity generator 35 was provided to the charge and discharge control device 30, but may instead be provided outside the charge and discharge control device 30, and inside the vehicle 20.

(J)

In the above embodiment, an example was given in which an electric motorcycle was used as the moving body, but it may also be an electric bicycle, an electric unicycle, an electric automobile (EV), a PHV (plug-in hybrid vehicle), or another such vehicle.

INDUSTRIAL APPLICABILITY

The charge and discharge control device, charge and discharge control system, and remaining battery capacity adjustment method of the present invention have the effect of reducing the amount of work entailed by battery replacement, and can be widely applied to vehicles driven by replaceable batteries.

REFERENCE SIGNS LIST 1 battery system
10, 10A, 10B, 10C, 10D battery pack 11, 11A, 11B, 11C, 11D capacitor (an example of a battery)
12, 12A, 12B, 12C, 12D remaining capacity estimator
20 vehicle (an example of a moving body)
20a seat
20b handle bar
21 motor
22 rear wheel
23 front wheel
30 charge and discharge control device
31 current location acquisition component
32 station location acquisition component
33 required power calculator
34 receiver (an example of a remaining capacity acquisition component)
35 target remaining capacity generator
36 charge and discharge controller
37 lower limit value setting component (an example of a lower limit value acquisition component)
38 upper limit value setting component (an example of upper limit value acquisition component)
40 charge and discharge control system
100 station
100a receptacle

The invention claimed is:

1. A charge and discharge control device configured to control the charging and discharging of a plurality of batteries configured to be removably connected in parallel to a moving body, the charge and discharge control device comprising:
a remaining capacity acquisition component configured to acquire remaining capacity of each of the batteries;
a required power calculator configured to calculate an amount of power required to reach a station where battery exchange is performed from position information about the station and a current location of the moving body;
a target remaining capacity generator configured to calculate target remaining capacity of each battery upon arrival at the station in which some of the batteries have a low remaining capacity and others of the batteries have a high remaining capacity, from a required power amount calculated by the required power calculator and sum of the remaining capacity of each of the batteries acquired by the remaining capacity acquisition component; and
a charge and discharge controller configured to perform charging and discharging among the batteries so that the target remaining capacity calculated by the target remaining capacity generator is attained, wherein
the target remaining capacity generator calculates the target remaining capacity of each of the batteries so that there is a distribution in remaining capacity of the plurality of batteries upon arrival at the station, and remaining capacity of each of the batteries upon arrival at the station is between a lower limit value and an upper limit value set for the batteries.

2. The charge and discharge control device according to claim 1,
further comprising a lower limit value acquisition component configured to acquire a lower limit value of remaining capacity for the plurality of batteries,
wherein the target remaining capacity generator sets the target remaining capacity for at least one of the plurality of batteries to be the lower limit value set for that battery.

3. The charge and discharge control device according to claim 2,
wherein, when there are a plurality of the batteries that cannot be set to the lower limit value, the target remaining capacity generator sets the target remaining capacity of each of the batteries so that remaining capacity of one of the plurality of batteries is as small a value as possible upon arrival at the station.

4. The charge and discharge control device according to claim 1,
further comprising an upper limit value acquisition component configured to acquire an upper limit value for remaining capacity in the plurality of batteries,
wherein the target remaining capacity generator sets the target remaining capacity for at least one of the plurality of batteries to be the upper limit value set for that battery.

5. The charge and discharge control device according to claim 4,
wherein, when there are a plurality of the batteries that cannot be set to the upper limit value, the target remaining capacity generator sets the target remaining capacity of each of the batteries so that the remaining capacity of one of these batteries is as large a value as possible upon arrival at the station.

6. The charge and discharge control device according to claim 1,
wherein the target remaining capacity generator calculates the target remaining capacity of each of the batteries so as to maximize difference between an overall remaining capacity in a group of one or more of the batteries to be replaced at the station, and an overall remaining capacity in a group of one or more of the batteries not to be replaced, upon arrival at the station.

7. The charge and discharge control device according to claim 2,
wherein the lower limit value acquisition component sets the lower limit value.

8. The charge and discharge control device according to claim 4,
wherein the upper limit value acquisition component sets the upper limit value.

9. The charge and discharge control device according to claim 1,
wherein the lower limit value is zero or a discharge lower limit value.

10. The charge and discharge control device according to claim 1,
wherein the upper limit value is a value of full charge capacity or a charge upper limit value.

11. The charge and discharge control device according to claim 1,
wherein the moving body is an electric motorcycle or an electric bicycle.

12. A charge and discharge control system, comprising:
a remaining capacity estimator configured to estimate remaining capacity of a plurality of batteries configured to be removably connected in parallel to a moving body;
a required power calculator configured to calculate an amount of power required to reach a station where battery exchange is performed from position information about the station and a current location of the moving body;
a target remaining capacity generator configured to calculate target remaining capacity of each battery upon arrival at the station in which some of the batteries have a low remaining capacity and others of the batteries have a high remaining capacity, from a required power amount calculated by the required power calculator and sum of the remaining capacity of each of the batteries estimated by the remaining capacity estimator; and a charge and discharge controller configured to perform charging and discharging among the batteries so that the target remaining capacity calculated by the target remaining capacity generator is attained, wherein the target remaining capacity generator calculates the target remaining capacity of each of the batteries so that there is a distribution in remaining capacity of the plurality of batteries upon arrival at the station, and remaining capacity of each of the batteries upon arrival at the station is between a lower limit value and an upper limit value set for the batteries.

13. A remaining battery capacity adjustment method for adjusting remaining capacity of a plurality of batteries configured to be removably connected in parallel to a moving body, the remaining battery capacity adjustment method comprising:

a remaining capacity acquisition step of acquiring remaining capacity of each of the batteries;

a power calculation step of calculating an amount of power required to reach a station where battery exchange is performed from position information about the station and a current location of the moving body;

a target remaining capacity generation step of calculating target remaining capacity of each battery upon arrival at the station in which some of the batteries have a low remaining capacity and others of the batteries have a high remaining capacity, from a required power amount calculated in the required power calculation step and sum of the remaining capacity of each of the batteries acquired in the remaining capacity acquisition step; and a charge and discharge control step of performing charging and discharging among the batteries so that the target remaining capacity calculated in the target remaining capacity generation step is attained, wherein, in the target remaining capacity generation step, the target remaining capacity of each of the batteries is calculated so that there is a distribution in remaining capacity of the plurality of batteries upon arrival at the station, and remaining capacity of each of the batteries upon arrival at the station is between a lower limit value and an upper limit value set for the batteries.

* * * * *